APPARATUS FOR DETECTING ERRORS IN A POLYLEVEL CODED WAVEFORM

Filed Feb. 13, 1964 3 Sheets-Sheet 1

INVENTOR.
ADAM LENDER
BY
Lippincott, Ralls & Hendricson
ATTORNEYS

Sept. 19, 1967 A. LENDER 3,343,125

APPARATUS FOR DETECTING ERRORS IN A POLYLEVEL CODED WAVEFORM

Filed Feb. 13, 1964 3 Sheets-Sheet 2

INVENTOR.
ADAM LENDER

BY

Lippincott, Ralls & Hendricson

ATTORNEYS

INVENTOR.
ADAM LENDER
BY
Lippincott, Ralls & Hendricson
ATTORNEYS

United States Patent Office 3,343,125

Patented Sept. 19, 1967

3,343,125

APPARATUS FOR DETECTING ERRORS IN A POLYLEVEL CODED WAVEFORM

Adam Lender, Palo Alto, Calif., assignor, by mesne assignments, to Automatic Electric Laboratories, Inc., Northlake, Ill., a corporation of Delaware Filed Feb. 13, 1964, Ser. No. 344,606
6 Claims. (Cl. 340—146.1)

ABSTRACT OF THE DISCLOSURE

The invention disclosed and claimed herein comprises apparatus for detecting errors in transmitted signals having a multiple-level coded waveform and generated from a binary waveform. More particularly, the apparatus includes a combining means receiving a binary waveform converted from a polylevel coded waveform with the output connected to remembering means producing an output of ($b$—2) successive input combination (wherein $b$ is the number of levels in the polylevel coded waveform.) The output of the remembering means is also connected to the input of the combining means and to auditing means feeding a pair of coincidence means. Detecting means produce different output signals for upper and lower levels of input polylevel coded waveform which are applied to the coincident means. Error-indicating means are operated from the coincidence means.

This invention relates to an apparatus for detecting errors in a polylevel coded waveform which has been converted to a binary waveform. Such a polylevel coded waveform has at least three levels, including an uppermost and a lowermost level. Two types of polylevel coded waveforms include polybinary and polybipolar waveforms. More particularly, the invention provides a method and apparatus for examining the polylevel coded waveform and comparing it with the binary waveform to which it has been converted. By making certain checks, the apparatus can detect most errors in the polylevel coded waveform wherein such waveform deviates from the rules governing its correlation to the converted binary data.

A primary advantage of the error detection equipment of this invention over conventional error-checking systems is that no introduction of redundant digits into the original binary data stream is required. Redundancies are certain extra pulses which are introduced along with the transmitted signal. At the receiving end, these redundancies are checked for a certain predetermined correspondence with the transmitted signals. Should this correspondence fail, errors are known to have been made. An error detection scheme based upon the introduction of redundancies has certain inherent disadvantages. First, additional equipment is required at the transmission end of the system to introduce the redundancies; extra equipment is similarly required at the receiver to remove them. Second, the transmission of the extra bits which contain no actual data, solely for error detection, necessarily reduces the number of useful data bits which can be transmitted in a given time, thus slowing data transmission. Contrary to the prior art, the apparatus of this invention relies upon a known correlation between portions of the coded waveform itself.

The method and apparatus of this invention are applicable for error detection in polylevel coded waveforms, which include polybinary waveforms and polybipolar waveforms. Certain minor changes in the apparatus need be made when one or the other of the above two types of polylevel coded waveforms are used. These will be described in detail later. For a complete description of the generation of polybipolar and polybinary coded waveforms, reference is made to two copending applications of the same inventor, U.S. patent application Ser. No. 338,445, filed Jan. 17, 1964 and U.S. patent application Ser. No. 342,312, filed Feb. 4, 1964 and issued as U.S. Patent No. 3,317,720.

The apparatus of this invention is generally used at the receiver portion of the transmission system. This receiver portion receives the polylevel coded waveform and converts same into the original binary waveform. Thus, at the receiver, two waveforms are available; the polylevel coded waveform (polybinary or polybipolar) and the converted binary waveform.

Briefly, the apparatus for detecting errors in a polylevel coded waveform which has been converted to a binary waveform (such coded waveform having at least three levels, including an uppermost and a lowermost level) comprises:

(a) A combining means for combining the present binary pulse in the converted binary waveform with the binary pulses generated in successive ($b$—2) combinations carried out in said combining means, wherein $b$ is the number of levels in said polylevel coded waveform, said combining means providing a binary output pulse of one polarity of the number of binary ones if said combination is even, and of the opposite polarity if the number of binary ones in such combination is odd;

(b) A remembering means connected to the output of the combining means, the remembering means remembering the ($b$—2) successive combinations and having its output connected to the input of the combining means;

(c) An auditing means for auditing the contents of the remembering means to ascertain if the remembering means contains the number of binary ones consistent with a polylevel coded waveform having an uppermost level, and in that event, providing a signal, and for auditing the contents of the remembering means to ascertain if the remembering means contain the number of binary ones consistent with a polylevel coded waveform having a lowermost level and in that event, providing a different signal;

(d) Detecting means for detecting the presence of the uppermost and lowermost levels of the pulses in the polylevel coded waveform, the detecting means providing one output pulse in the event of detection of the uppermost level and a different output pulse in the event of detection of the lowermost level;

(e) A pair of coincidence means, the first of which provides an output signal in the event an output signal from the auditing means, indicating the binary ones consistent with an uppermost level, fails to coincide with an output signal from the detecting means indicating the presence of the uppermost level in the polylevel coded waveform, and the second of which provides an output signal in the event an output signal from the second auditing means, indicating the binary ones consistent with a lowermost level, fails to coincide with an output pulse from the detecting means indicating the presence of the lowermost level in the polylevel coded waveform; and (f) An error indicating means connected to the outputs of the pair of coincidence means to indicate an error in the event of an output signal from either of the coincidence means.

By minor variations in the auditing means, the apparatus of this invention can be adapted to detect errors in either a polybipolar or a polybinary waveform. In a preferred embodiment of the invention, the output of the pair of coincidence means can be connected into the remembering means. This connection provides an automatic reset mechanism. When an error is found to have occurred, such a connection automatically resets the remembering means to the proper number of binary ones consistent with the level detected in the detecting means. In that way, each error, once detected by the apparatus of this invention, does not affect subsequent data transmitted. Therefore, the preferred embodiment of this invention not only detects errors, but resets itself to coincide with the data so that one error will not propagate itself and appear to have also occurred in subsequent transmitted data.

The details of the method of the invention, and the preferred embodiments of the apparatus for carrying it out, will be more fully understood from the more detailed description which follows, referring to the drawings, in which.

Figure 1:
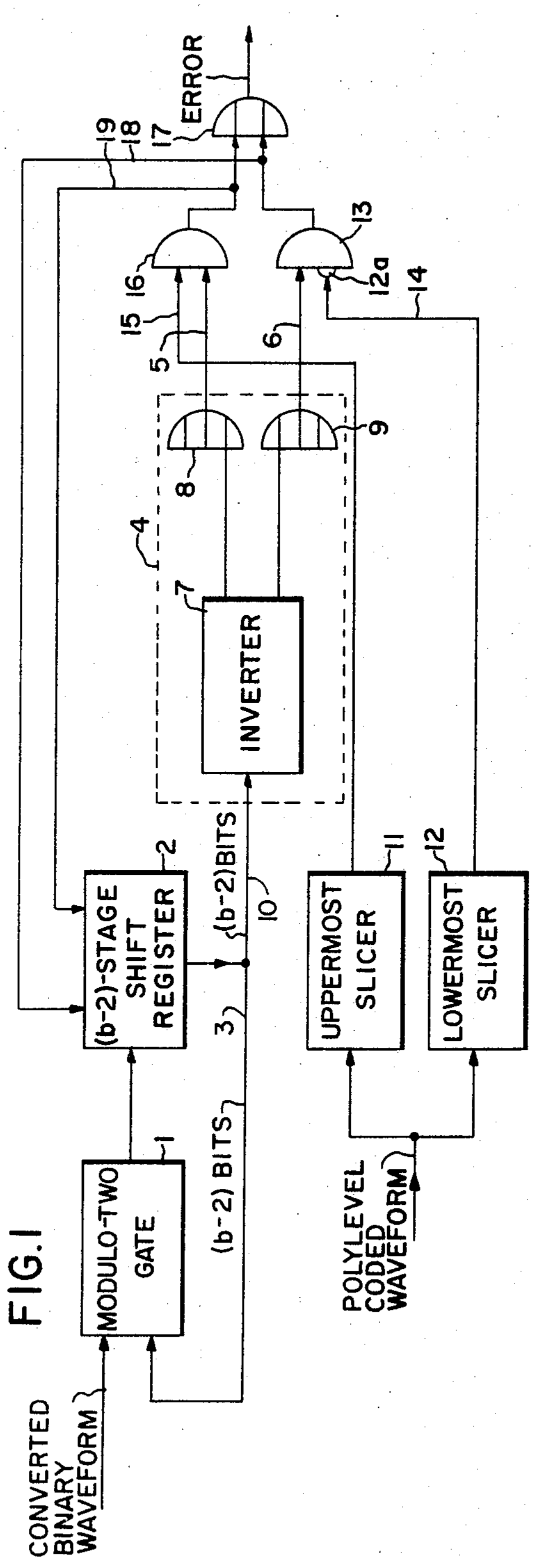
FIG. 1 is a block diagram of one embodiment of the error detector of this invention.

Referring to FIG. 1, the apparatus for detecting errors in a polylevel coded waveform which has been converted to a binary waveform is shown. The coded waveform has at least three levels, including an uppermost and a lowermost level. This binary waveform is passed to a combining means, for example, modulo-two gate 1. A modulo-two gate is a conventional piece of digital logic equipment and needs no further description here. Modulo-two gate 1 combines the present binary pulse of the binary waveform with the binary pulses generated in successive $(b-2)$ combinations carried out in modulo-two gate 1. Modulo-two gate 1 provides a binary output pulse of one polarity if the number of binary ones in such combination is even, and of the opposite polarity if the number of binary ones in such comibnation is odd. For example, if the number of binary ones is even, gate 1 may provide a binary zero as an output pulse; if the number of binary ones is odd, gate 1 may provide a binary one output pulse. Modulo-two gate 1 makes strictly binary decisions. The input to modulo-two gate 1 from a conventional clock pulse generator (not shown) insures that the binary data enters the gate in a synchronized manner.

The binary output pulses from modulo-two gate 1 are passed to a remembering means, such as a $(b-2)$-stage shift register 2. Shift register 2 remembers $(b-2)$ successive combinations carried out in modulo-two gate 1. The output of each of the $(b-2)$ stages of shift register 2 are connected to the input of modulo-two gate 1 through line 3. The outputs of each stage shift register 2 are also connected to an auditing means, shown combined in the dotted box 4.

The auditing means 4 is for auditing the contents of $(b-2)$-stage shift register 2 to ascertain if the shift register contains the requisite binary ones consistent with a polylevel coded waveform having an uppermost level. In that event, auditing means 4 provides a predetermined output signal through line 5. Auditing means 4 also audits the contents of $(b-2)$-stage shift register 2 to ascertain if the shift register contains the requisite binary ones consistent with a polylevel coded waveform having a lowermost level. In that event, the auditing means provides a predetermined output signal through line 6.

Auditing means 4 includes an inverting means 7 for inverting certain selected ones of the output pulses from $(b-2)$-stage shift register 2. The auditing means 4 also includes a separating means, such as OR-gates 8 and 9, for separating the output pulses from shift register 2, including those inverted in inverting means 7, into one set of pulses consistent with a polylevel coded waveform having an uppermost level, and another set of pulses consistent with a polylevel coded waveform having a lowermost level.

It must be understood that the output line 10 from $(b-2)$-stage shift register 2 actually contains a plurality of lines, one for each stage of the shift register. However, only certain of these lines are inverted by the inverting means 7 and passed to OR-gate 8; similarly, certain others of these lines are inverted by inverting means 7 and passed into OR-gate 9. The remainder of lines are passed to one or the other of OR-gates 8 and 9 without being inverted. The particular selection of lines to invert for the various polylevel coded waveforms will be fully described in connection with the specific embodiments described below.

The invention also uses detecting means, preferably slicers 11 and 12, for detecting the presence of the uppermost and lowermost levels in the polylevel coded waveform. Accordingly, the polylevel coded waveform is passed through both uppermost slicer 11 and lowermost slicer 12. Each of these slicers provides one output pulse in the event of detection of the uppermost level of the input waveform, and a different output pulse in the event of detection of the lowermost level. Uppermost level slicer 11 usually provides a positive output pulse in the event of detection of an uppermost level in the polylevel coded waveform. Lowermost level slicer 12 usually provides a negative output pulse (or binary zero) in the event of detection of the lowermost level, and a positive output pulse (or binary one) in the event of the detection of other levels. Therefore, the output signal from lowermost slicer 12 is inverted by inverter **12*a***. These slicers are conventional and need no further description.

The output signal from lowermost slicer 12 is passed to the first of a pair of coincidence means, such as AND-gate 13. The signals to this AND-gate 13 are designed so that if a positive signal on line 6 and a negative signal on line 14 (inverted by inverter **12*a*) occur simultaneously, an error has occurred. A negative signal on line 14 indicates the presence of a lowermost level pulse in the polylevel coded waveform. If the proper number of binary ones were stored in shift register 2 consistent with a lowermost level, there would be no output signal from OR-gate 9 on line 6. In that event, AND-gate 13 would have no output signal because one input signal was lacking, and no error would be indicated. However, in the event the signal on line 6 from the auditing means fails to indicate that the contents of shift register 2 is consistent with a lowermost level pulse, as indicated by the detecting means, then line 6 will provide a positive signal to AND-gate 13. The coincidence of the positive signal from line 6 and the negative signal on line 14 will cause AND-gate 13** to provide an output signal, indicating an error.

Similarly, uppermost slicer 11 provides a positive signal on line 15 in the event of detection of an uppermost level pulse in the polylevel coded waveform. The auditing means 4, through OR-gate 8 provides a positive signal on line 5 whenever the contents of shift register 2 are not the proper ones consistent with an uppermost level of the polylevel coded waveform. When such an inconsistency occurs, AND-gate 16 will have two positive input signals and will thus provide an output signal, indicating an error.

The output signals from the pair of coincidence means, i.e., AND-gates 13 and 16, either of which indicates an error, are passed to OR-gate 17. OR-gate 17 will, therefore, indicate an error in the event of an output signal from either gate 13 or gate 16.

In a preferred embodiment of the invention illustrated in FIG. 1, line 18 connects the output of AND-gate 13 to the shift register 2; similarly, line 19 connects the output of AND-gate 16 to shift register 2. In this way, an error pulse from AND-gate 13 sets the shift register to the setting consistent with the lowermost level of the polylevel coded waveform detected by slicer 12. Therefore, the error will not be propagated to subsequent pulses in the polylevel coded waveform. In the same way, an output pulse from AND-gate 16 is passed through line 19 through shift register 2. This pulse sets the shift register to the setting consistent with the uppermost level of the polylevel coded waveform. These connections between the pair of coincidence means 13 and 16 and shift register 2 therefore set the shift register to the requisite binary ones consistent with the detected level of the polylevel coded waveform.

Figure 2:
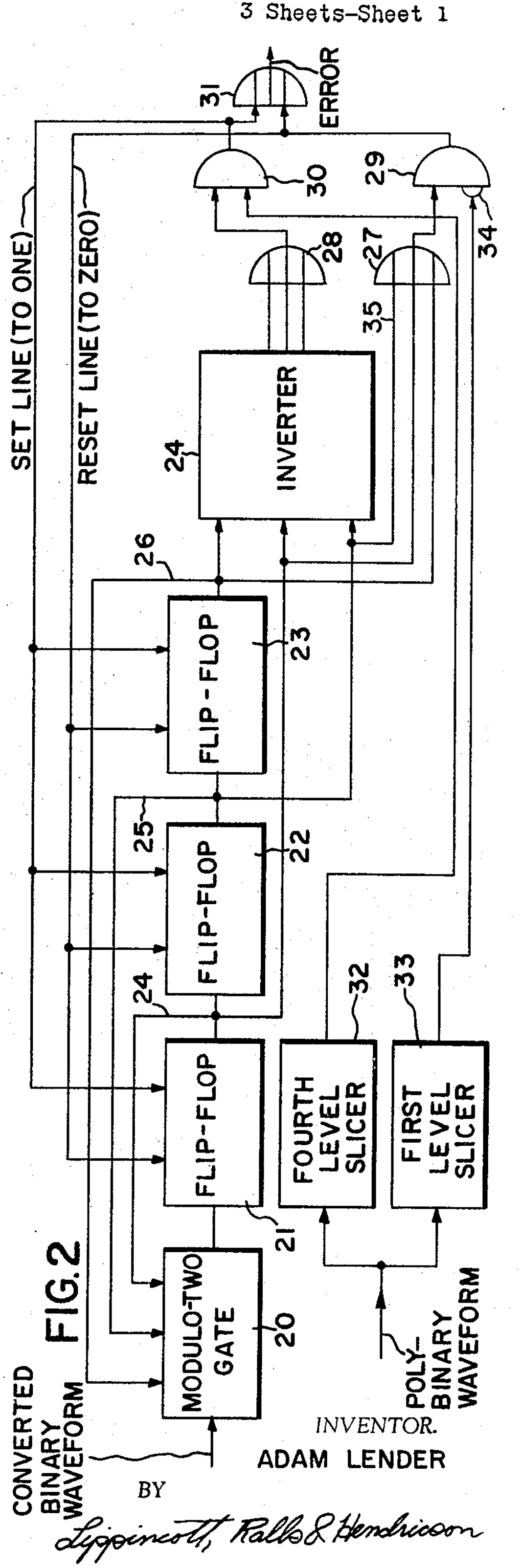
FIG. 2 is a block diagram of an error detection system of this invention particularly adapted to detect errors in a polybinary transmission system.

A preferred embodiment of the invention is shown in FIG. 2, adapted to detect errors in a polybinary waveform which has been converted to a binary waveform. The converted binary waveform is fed to modulo-two gate 20. Modulo-two gate 20 operates on the waveform to perform a modulo-two combination. A binary one output pulse is emitted from gate 20 if the number of binary ones fed to its input is odd, and a binary zero output pulse if that number is even. The binary output pulses from modulo-two gate 20 are fed to flip-flops 21, 22, and 23, which together act as a three-stage shift register. The output of each flip-flop is recycled through lines 24, 25, and 26 to modulo-two gate 20, as shown. The flip-flops are connected in cascade fashion with the output of flip-flop 21 connected to the input of flip-flop 22, and the output of flip-flop 22 to the input of flip-flop 23. The output of each of the flip-flops is connected to inverter 24, and also directly to OR-gate 27. The pulses from flip-flops 21, 22, and 23 are inverted in inverter 24 and then passed to OR-gate 28. The output of OR-gate 27 is connected to AND-gate 29; the output of OR-gate 28 is connected to AND-gate 30. The outputs of AND-gates 29 and 30 are both connected to OR-gate 31. The output of AND-gate 30 is also connected to the SET line of flip-flops 21, 22, and 23. Similarly, the output of AND-gate 29 is also connected to the RESET line of flip-flops 21, 22, and 23.

The polybinary waveform is passed through fourth level slicer 32 and first level slicer 33. The output of slicer 32 is connected to the input of OR-gate 30; the output of slicer 33 is connected through inverter 34 to the input of AND-gate 29.

Figure 3:
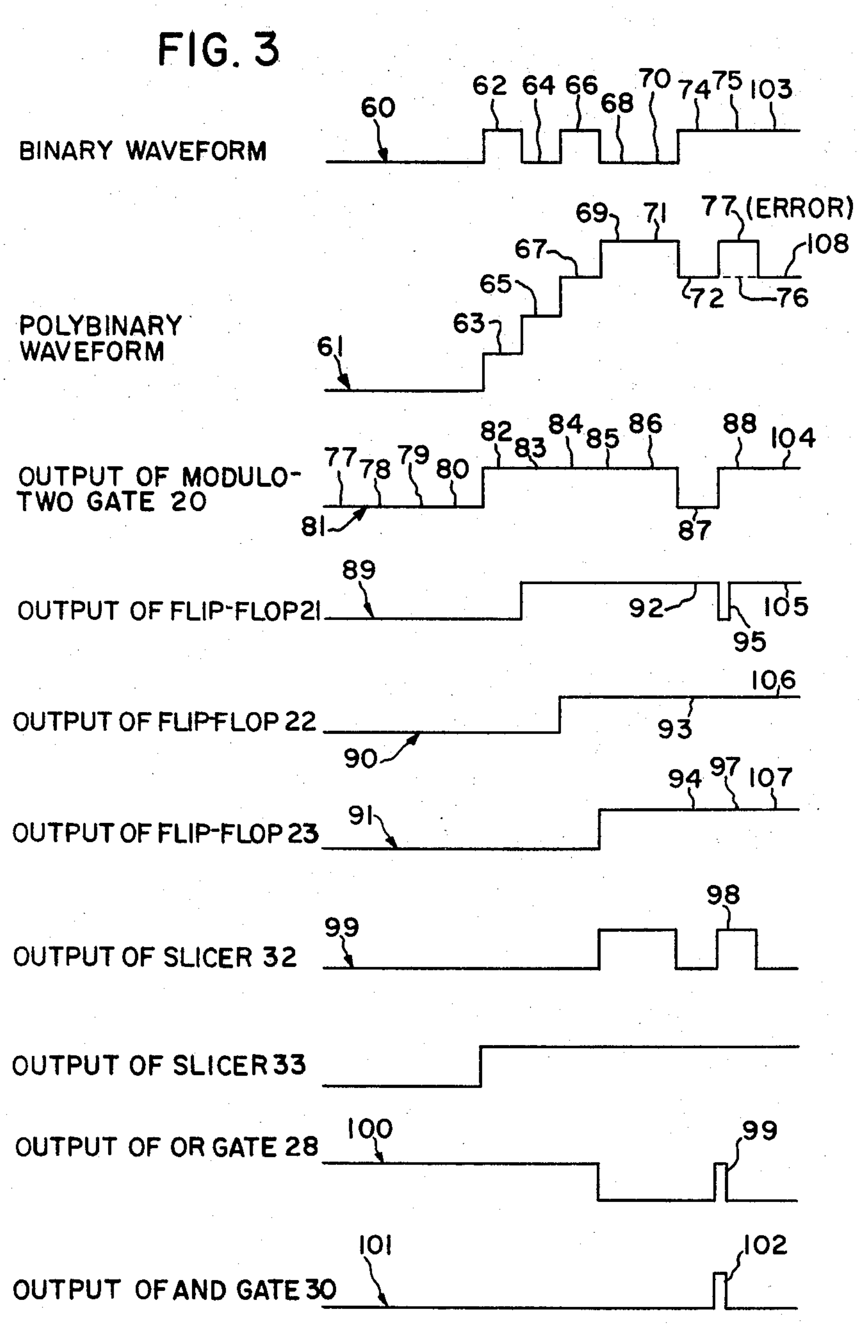
FIG. 3 shows the waveform incident in the embodiment of the invention shown in FIG. 2.

The operation of the embodiment of the invention shown in FIG. 2 can be best described using a specific example. The waveforms used in this example are shown in FIG. 3. The first operation on the binary waveform 60 is a modulo-two combination. In such a modulo-two combination, the present binary pulse in the binary waveform is combined with ($b$—2) other pulses generated in previous modulo-two combinations. A modulo-two combination counts binary ones; an even number of binary ones results in a zero output; an odd number results in a one. Assuming a five-level system ($b$=5), the present binary pulse is first combined with three pulses generated in the previous three modulo-two combinations. Assume, for illustration, that the previous three pulses were 1–0–1 in the modulo-two pulse train. If the binary input pulse from the binary waveform is a one, the total number of ones is three (an odd number). The modulo-two output is therefore one—the proper output for an odd number.

Referring to FIG. 3, a binary waveform 60 is shown. This waveform has been reconverted from a polybinary waveform 61. The first four binary pulses of waveform 60 are all zeros. Assume initially that the shift register contained all zeros, then the modulo-two combination of three zeros in the shift register and one zero of binary waveform 60 results in zero in the output of modulo-two gate 20, shown on waveform 81 (pulse 80). The next binary pulse 62 is a one. When this pulse is combined with the previous three ($b$—2) modulo-two combinations, which were all zeros (pulses 78, 79, and 80), there is a total of only one binary one. Since one is an odd number, the modulo-two combination for an odd number is one.

The next binary pulse 64 is a zero. Two of the previous three modulo-two combinations (pulses 79 and 80) are zeros, and the third (pulse 82) is a one. The next binary pulse 64 is a zero. This makes a total of only one binary one. One is an odd number, so the modulo-two result is again a one.

The next binary pulse 66 is a one. Two of the previous three modulo-two combinations (pulses 82 and 83) were ones. These two ones, combined with the present binary one, total three ones (an odd number), to generate a modulo-two combination of one (pulse 84). Finally, the next binary pulse 68 is a zero. This pulse, combined with the previous three ones in the previous three modulo-two combinations (pulses 82, 83, and 84) results in an odd number of ones (three). The modulo-two combination is thus again a one (pulse 85).

The next binary pulse 70 is a zero. The previous three modulo-two combinations were ones. The total number of ones is three—an odd number—thus generating another modulo-two combination of one (pulse 86). Since all the previous three modulo-two combinations were also ones, there is still a total of four ones. Binary pulse 74 is a one. The total of four ones (an even number) generates a modulo-two combination of zero (pulse 87).

The next binary pulse 75 is a one. This pulse, combined with the previous three combinations result in three ones and a zero (an odd number of ones). The resulting modulo-two combination is a one (pulse 88). The polybinary waveform 61 is generated at the transmitter and arrives at the receiver, as shown in 61, with pulse 76 changed by noise on the line to pulse 77.

Waveform 89 shows the contents of flip-flop 21. This flip-flop always contains the previous pulse from modulo-two gate 20. Similarly, flip-flop 22 contains the penultimate pulse from modulo-two gate 20. The contents of this flip-flop are shown as waveform 90. Finally, flip-flop 23 contains the antepenultimate pulse from modulo-two gate 20, and has its contents shown as waveform 91.

During binary pulse 74, flip-flop 21 contained a one, as shown at pulse 92. Flip-flop 22 contained a one (pulse 93), and flip-flop 23 contained a one (pulse 94). These three ones were all passed through inverter 24, which made them zeros. OR-gate 28 received no positive input pulses, and contributed no input pulse to AND-gate 30. At binary pulse 74, fourth level slicer 32 detected no fifth level (polybinary pulse 72 is fourth level pulse), so that slicer 32 also failed to contribute an input pulse to AND-gate 30. AND-gate 30 therefore had no error output pulse. AND-gate 29 also had no error output pulse because first level slicer 33 failed to detect the first level.

At the next binary pulse 75, flip-flop 21 contained zero pulse 95. Flip-flop 22 contained pulse 96 (a one), and flip-flop 23 contained a one (pulse 97). The ones in flip-flops 22 and 23 were inverted to zeros by inverter 24. The zero from flip-flop 21, however, became a one. This one caused OR-gate 28 to provide a positive input pulse to AND-gate 30, shown as pulse 99 on waveform 100. At the same time, uppermost level slicer 32 detected the erroneous uppermost level polybinary pulse 77. Slicer 32 therefore had a positive output pulse 98 (shown on waveform 99). This pulse was passed to AND-gate 30. It arrived at AND-gate 30 in coincidence with the above positive signal (pulse 99) from OR-gate 28. The combined signals at AND-gate 30 resulted in an error output signal, which appeared as pulse 101 on waveform 102. This signal indicates an error—or a violation of the coding rules for the polybinary coded waveform.

The error signal, emergent from AND-gate 30, is also passed to the SET line of the shift register comprised of flip-flops 21, 22, and 23. Accordingly, the signal sets all of the flip-flops to the "one" state so that the error condition of flip-flop 21 does not propagate through the shift register. It is recalled that they should have all contained ones to be consistent with the polybinary fifth level pulse 77. Note that pulse 95 is of shorter than normal duration. Pulse 95 was originally a zero (inconsistent with the polybinary fifth level pulse 77). Once the inconsistency was recognized by the apparatus, an error pulse was generated on the SET line, and flip-flop 21 was SET, changing pulse 95 in the middle of its pulse duration from a zero to a one.

The next binary pulse on waveform 60 is pulse 103. This pulse is positive. The previous three modulo-two combinations shown on waveform 81 were one, zero, and one. The binary one contributes a third one (an odd number), resulting in a modulo-two combination of one, shown as pulse 104 on waveform 81. Flip-flop 21 contains a one (pulse 105), flip-flop 22 contains a one (pulse 106) and flip-flop 23 contains a one (pulse 107). The ones in each of the flip-flops are inverted in inverter 24, causing negative input signals and a negative output signal from OR-gate 28. Therefore, AND-gate 30 is missing one input, and generates no error signal.

For the case of a lowermost level error, assume that the first level slicer indicated a first level polybinary signal. AND-gate 29 will have one positive input signal. Assume further that one of the flip-flops, flip-flop 22, for example, contained a one. This is clearly inconsistent with a first level polybinary signal which requires that the entire shift register, formed by flip-flops 21, 22, and 23, have a zero content. The one in flip-flop 22 will be passed through line 34 and line 35 through OR-gate 27 to AND-gate 29. Thus, AND-gate 29 will simultaneously have two positive input pulses, and will generate an output signal. This output signal will be passed through gate 31 to indicate an error. Moreover, the error signal from AND-gate will be passed to RESET line, as shown, and will rest flip-flops 21, 22, and 23 to zero. Recalling that flip-flops 21 and 23 were already in the zero position, these flip-flops are unaffected. Flip-flop 22, having erroneously been in the one position, will be RESET by the pulse from AND-gate 29. Now all the flip-flops will be in the zero position, which corresponds with a first level polybinary pulse. Flip-flops 21, 22, and 23 (which combine to form the shift register) are now consistent with slicers 32 and 33. The detector can then continue its performance as usual until the next error is detected.

The above detailed description explains the operation of the embodiment of the invention using a five-level polybinary waveform. No detailed operation is given for any other levels, or for the embodiment of the invention shown in FIG. 4 using a polybipolar waveform. The details of the polybipolar waveform generation may be found in copending application Ser. No. 342,412, filed Feb. 4, 1964, now Patent No. 3,317,720, of the same inventor as this invention. Once a clear understanding is achieved of the above example, it is believed that the details of the waveforms become within the skill of the reader to generate for the other cases.

Figure 4:
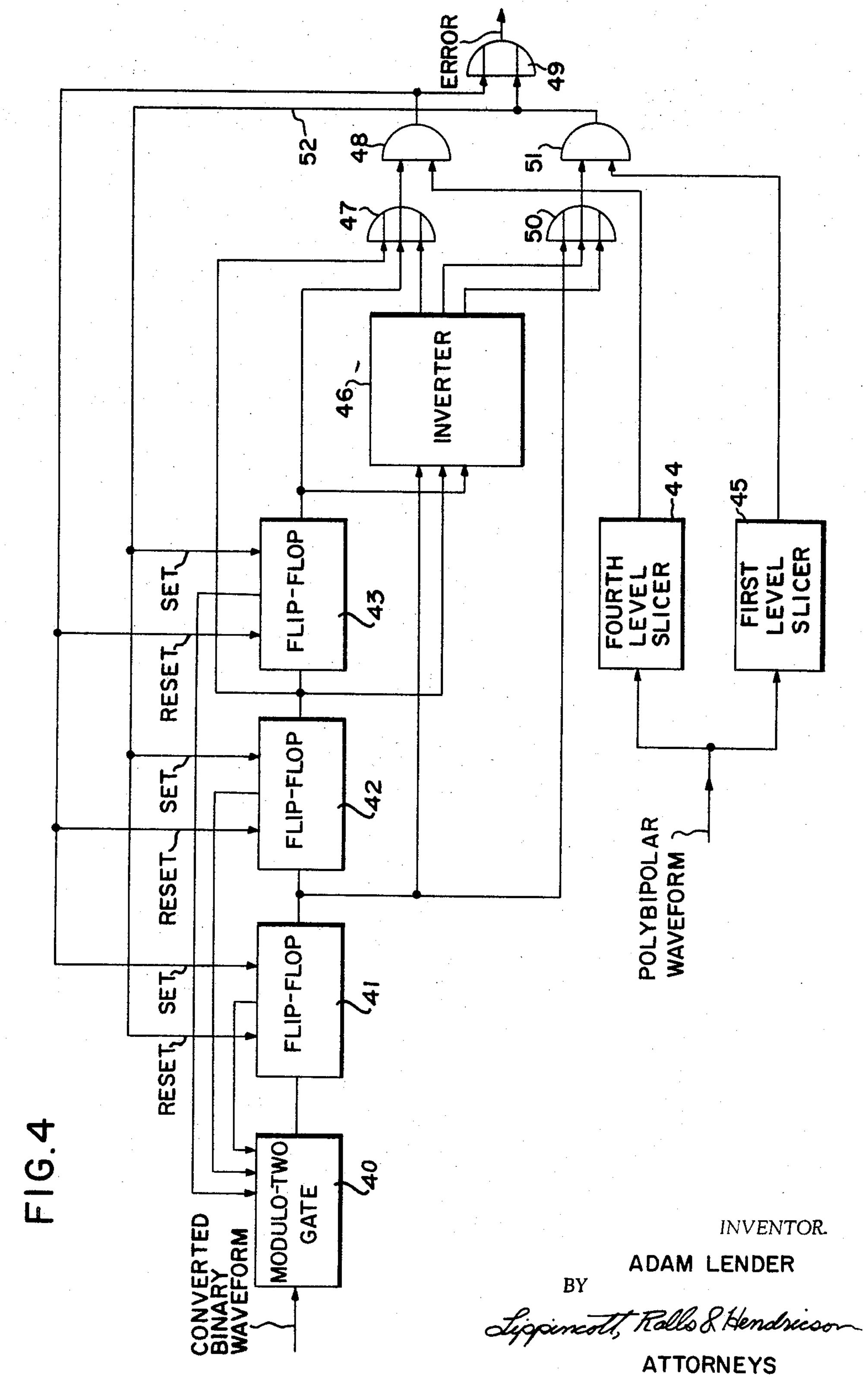
FIG. 4 is a block diagram of an error detector of this invention particularly adapted to detect errors in a polybipolar transmission system.

Referring to FIG. 4, an error detector embodiment of this invention is shown adapted for detecting errors in a polybipolar waveform. Modulo-two gate 40 and flip-flops 41, 42, and 43 all perform the same function as in the previous embodiment. Similarly, fourth level slicer 44 and first level slicer 45 detect the uppermost and lowermost levels, respectively, in the polybipolar waveform, as discussed above. In a polybipolar waveform, when an uppermost signal is detected, the first $(b-3)/2$ stages of the register should contain a binary one, and remaining $(b-1(/2$ stages should contain a binary zero. In the illustrated embodiment, $b=5$. Therefore, the first stage of the shift register (flip-flop 41) should contain a binary one, and the last two stages of the shift register (flip-flops 42 and 43) should contain binary zeros. Assuming the correct conditions exist, the binary one in flip-flop 41 will be inverted by inverter 46 so that there is no positive input pulse from inverter 46 to OR-gate 47. The last two flip-flops 42 and 43 are connected directly to OR-gate 47 (not through inverter 46). Since these flip-flops should contain binary zeros, again no positive pulses are passed to OR-gate 47. With these correct conditions existing consistent with an uppermost (fifth level polybipolar pulse, the signal from fourth level slicer 44 will have no effect on AND-gate 48. If one or more of flip-flops 41, 42, or 43 were not in the state described above, consistent with the fifth level polybipolar pulse, OR-gate 47 would have provided a positive output signal to AND-gate 48 in coincidence with the positive signal from slicer 44. AND-gate 48 would then have provided an output signal to error gate 49 to indicate an error. Moreover, the error signal from AND-gate 48 is passed to the RESET lines of flip-flops 42 and 43. These are thus set to zero, the state consistent with a fifth level polybipolar pulse. Similarly, the output of AND-gate 48 is passed to the SET line of flip-flop 41. Thus, an error pulse from AND-gate 48 sets flip-flop 44 to one, which is also the correct state consistent with a fifth level polybipolar pulse.

The correct states of flip-flops 41, 42, and 43 for a lowermost level polybipolar pulse are zero, one, and one, respectively. Note that flip-flop 41 is connected directly to OR-gate 50 and flip-flops 42 and 43 are connected through inverter 46 to OR-gate 50. Thus, if the flip-flops are in the correct setting consistent with a first level polybipolar pulse, again OR-gate 50 will have no positive input pulses. Then the inverted pulse from first level slicer 45 (which is positive at the gate) will be unable to generate an output signal from AND-gate 51. No error will have been indicated.

In the same manner as before, if one of the flip-flops is in the inconsistent setting, AND-gate 51 will generate an error signal and pass the signal through error gate 49. The error signal will also be used to reset flip-flops 41, 42, and 43 to the consistent settings, as before.

It must be understood that the above specifically described embodiments represent but a few examples of the apparatus which could be applied to this invention. For example, the polarities of pulses (positive or negative, or "zero" or "one") could be reversed consistently without departing from the invention. Moreover, different logic circuitry could be employed by the skilled logic designer to achieve the same results. For the above reasons, the scope of the invention should not be limited by the above detailed description and drawings, but only as specifically set forth in the claims which follow:

What is claimed is:

1. Apparatus for detecting errors in a polylevel coded waveform which has been converted to a binary waveform, said coded waveform having at least three levls including an uppermost and a lowermost level, which apparatus comprises:

(a) a combining means for combining the present binary pulse in the converted waveform with the binary pulses generated in successive $(b-2)$ combinations carried out in said combining means, wherein $b$ is the number of levels in said polylevel coded waveform, said combining means providing a binary output pulse of one polarity if the number of binary ones in said combination is even and of the opposite polarity if the number of binary ones in said combination is odd;

(b) a remembering means connected to the output of said combining means, said remembering means remembering the said $(b-2)$ successive combinations in said combining means and having its output connected to the input of said combining means;

(c) an auditing means for auditing the contents of said remembering means to ascertain if said remembering means contains the number of binary ones consistent with a polylevel coded waveform having an uppermost level, and in that event, providing a signal, and for auditing the contents of said remembering means to ascertain if said remembering means contains the number of binary ones consistent with a polylevel coded waveform having a lowermost level, and in that event providing a different signal;

(d) detecting means for detecting the presence of the uppermost and lowermost levels of said polylevel coded waveform, said detecting means providing one output pulse in the event of detection of the uppermost level and a different output pulse in the event of detection of the lowermost level; and (e) a pair of coincidence means, the first of which provides an output signal in the event a signal from said auditing means consistent with an uppermost level fails to coincide with an output pulse from said detecting means indicating the presence of the uppermost level in said polylevel coded waveform, and the second of which provides an output signal in the event an output signal from said auditing means consistent with a lowermost level fails to coincide with an an output pulse from said detecting means indicating the presence of the lowermost level in said polylevel coded waveform; and (f) an error indicating means connected to the outputs of said pair of coincidence means to indicate an error in the event of an output signal from either of said coincidence means.

2. Apparatus for detecting errors in a polylevel coded waveform which has been converted to a binary waveform, said coded waveform having at least three levels including an uppermost and a lowermost level, which apparatus comprises:

(a) a combining means for combining the present binary pulse in the converted waveform with the binary pulses generated in successive $(b-2)$ combinations carried out in said combining means, wherein $b$ is the number of levels in said polylevel coded waveform, said combining means providing a binary output pulse of one polarity if the number of binary ones in said combination is even and of the opposite polarity if the number of binary ones in said combination is odd;

(b) a remembering means connected to the output of said combining means, said remembering means remembering the said $(b-2)$ successive combinations in said combining means and having its output connected to the input of said combining means;

(c) an auditing means for auditing the contents of said remembering means to ascertain if said remembering means contains the binary ones consistent with a polylevel coded waveform having an uppermost level, and in that event, providing a signal, and for auditing the contents of said remembering means to ascertain if said remembering means contains the binary ones consistent with a polylevel coded waveform having a lowermost level, and in that event, providing a different signal;

(d) a detecting means for detecting the presence of the uppermost and lowermost levels of said polylevel coded waveform, said detecting means providing one output pulse in the event of detection of the uppermost level, and a different output pulse in the event of detection of the lowermost level;

(e) a pair of coincidence means, the first of which provides an output signal in the event a signal from said auditing means consistent with an uppermost level fails to coincide with an output pulse from said detecting means indicating the presence of the uppermost level in said polylevel coded waveform, and the second of which provides an output signal in the event a signal from said auditing means consistent with a lowermost level fails to coincide with an output pulse from said detecting means indicating the presence of the lowermost level in said polylevel coded waveform; and (f) an error indicating means connected to the outputs of said pair of coincidence means to indicate an error in the event of an output signal from either of said coincidence means; and (g) a means connected between the outputs of said pair of coincidence means and said remembering means for setting the contents of said remembering means to the binary ones consistent with the detected level of the polylevel coded waveform in the event of the detection of an error.

3. Apparatus for detecting errors in a polylevel coded waveform which has been converted to a binary waveform, said coded waveform having at least three levels including an uppermost and a lowermost level, which apparatus comprises:

(a) a combining means including a modulo-two gate for combining the present binary pulse in the converted waveform with the binary pulses generated in successive $(b-2)$ combinations carried out in said combining means, wherein $b$ is the number of levels in said polylevel coded waveform, said combining means providing a binary output pulse of one polarity if the number of binary ones in said combination is even, and of the opposite polarity if the number of binary ones in said combination is odd;

(b) a remembering means, including a $(b-2)$-stage shift register, connected to the output of said combining means, said remembering means remembering the said $(b-2)$ successive combinations in said combining means and having its output connected to the input of said combining means;

(c) an auditing means for auditing the contents of said remembering means to ascertain if said remembering means contains the binary ones consistent with a polylevel coded waveform having an uppermost level, and in that event, providing a signal, and for auditing the contents of said remembering means to ascertain if said remembering means contains the binary ones consistent with a polylevel coded waveform having a lowermost level, and in that event, providing a different signal;

(d) a detecting means for detecting the presence of the uppermost and lowermost levels of said polylevel coded waveform, said detecting means providing one output pulse in the event of detection of the uppermost level, and a different output pulse in the event of detection of the lowermost level;

(e) a pair of coincidence means, the first of which provides an output signal in the event a signal from said auditing means consistent with an uppermost level fails to coincide with an output pulse from said detecting means indicating the presence of the uppermost level in said polylevel coded waveform, and the second of which provides an output signal in the event a signal from said auditing means consistent with a lowermost level fails to coincide with an output pulse from said detecting means indicating the presence of the lowermost level in said polylevel coded waveform; and (f) an error indicating means connected to the outputs of said pair of coincidence means to indicate an error in the event of an output signal from either of said coincidence means.

4. Apparatus for detecting errors in a polylevel coded waveform which has been converted to a binary waveform, said coded waveform having at least three levels including an uppermost and a lowermost level, which apparatus comprises:

(a) a combining means including a modulo-two gate for combining the present binary pulse in the converted waveform with the binary pulses generated in succesive $(b-2)$ combinations carried out in said combining means, wherein $b$ is the number of levels in said polylevel coded waveform, said combining means providing a binary output pulse of one polarity if the number of binary ones in said combination is even, and of the opposite polarity if the number of binary ones in said combination is odd;

(b) a remembering means including a $(b-2)$-stage shift register connected to the output of said combining means, and remembering means remembering the $(b-2)$ successive combinations in said combining means and having its output connected to the input of said combining means;

(c) an auditing means for auditing the contents of said remembering means to ascertain if said remembering means contains the binary ones consistent with a polylevel coded waveform having an uppermost level, and in that event, providing a signal, and for auditing the contents of said remembering means to ascertain if said remembering means contains the binary ones consistent with a polylevel coded waveform having a lowermost level, and in that event, providing a different signal, said auditing means including an inverting means for inverting certain selected ones of the output pulses from said remembering means, and a separating means for separating the output pulses from said remembering means including those inverted in said inverting means, into one set of pulses consistent with a polylevel coded waveform having an uppermost level, and another set of pulses consistent with a polylevel coded waveform having a lowermost level;

(d) a detecting means including a pair of slicers for detecting the presence of the uppermost and lowermost levels of said polylevel coded waveform, said detecting means providing one output pulse in the event of detection of the uppermost level, and a different output pulse in the event of detection of the lowermost level;

(e) a pair of coincidence means, the first of which provides an output signal in the event a signal from said auditing means consistent with an uppermost level fails to coincide with an output pulse from said detecting means indicating the presence of the uppermost level in said polylevel coded waveform, and the second of which provides an output signal in the event a signal from said auditing means consistent with a lowermost level fails to coincide with an output pulse from said detecting means indicating the presence of the lowermost level in said polylevel coded waveform; and (f) an error indicating means connected to the outputs of said pair of coincidence means to indicate an error in the event of an output signal from either of said coincidence means.

5. Apparatus for detecting errors in a polylevel coded waveform which has been converted to a binary waveform, said coded waveform having at least three levels including an uppermost and a lowermost level, which apparatus comprises:

(a) a combining means for combining the present binary pulse in the converted waveform with the binary pulses generated in successive $(b-2)$ combinations carried out in said combining means, wherein $b$ is the number of levels in said polylevel coded waveform, said combining means providing a binary output pulse of one polarity if the number of binary ones in said combination is even, and of the opposite polarity if the number of binary ones in said combination is odd;

(b) a remembering means connected to the output of said combining means, said remembering means remembering the said $(b-2)$ successive combinations in said combining means and having its output connected to the input of said combining means;

(c) an auditing means for auditing the contents of said remembering means to ascertain if said remembering means contains the binary ones consistent with a polylevel coded waveform having an uppermost level, and in that event, providing a signal, and for auditing the contents of said remembering means to ascertain if said remembering means contains the binary ones consistent with a polylevel coded waveform having a lowermost level, and in that event, providing a different signal, said auditing means including an inverting means for inverting certain selected ones of the output pulses from said remembering means, and a separating means for separating the output pulses from said remembering means, including those inverted in said inverting means, into one set of pulses consistent with a polylevel coded waveform having an uppermost level, and another set of pulses consistent with a polylevel coded waveform having a lowermost level, said inverting means including a plurality of inverters connected to the output of said remembering means, said separating means including a pair of OR-gates;

(d) a detecting means including a pair of slicers for detecting the presence of the uppermost and lowermost levels of said polylevel coded waveform, said detecting means providing one output pulse in the event of detection of the uppermost level, and a different output pulse in the event of detection of the lowermost level;

(e) a pair of coincidence means, the first of which provides an output signal in the event a signal from said auditing means consistent with an uppermost level fails to coincide with an output pulse from said detecting means indicating the presence of the uppermost level in said polylevel coded waveform, and the second of which provides an output signal in the event a signal from said auditing means consistent with a lowermost level fails to coincide with an output pulse from said detecting means indicating the presence of the lowermost level in said polylevel coded waveform;

(f) an error indicating means connected to the outputs of said pair of coincidence means to indicate an error in the event of an output signal from either of said coincidence means; and (g) a means connected between the outputs of said pair of coincidence means and said remembering means for setting the contents of said remembering means to the binary ones consistent with the detected level of the polylevel coded waveform in the event of the detection of an error.

6. Apparatus for detecting errors in a polylevel coded waveform which has been converted to a binary waveform, said coded waveform having at least three levels including an uppermost and a lowermost level, which apparatus comprises:

(a) a combining means including a modulo-two gate for combining the present binary pulse in the converted waveform with the binary pulses generated in successive $(b-2)$ combinations carried out in said combining means, wherein $b$ is the number of levels in said polylevel coded waveform, said combining means providing a binary output pulse of one polarity if the number of binary ones in said combination is even, and of the opposite polarity if the number of binary ones in said combination is odd;

(b) a remembering means including a $(b-2)$-stage shift register connected to the output of said combining means, said remembering means remembering the said $(b-2)$ successive combinations in said combining means and having its output connected to the input of said combining means;

(c) an auditing means for auditing the contents of said remembering means to ascertain if said remembering means contains the binary ones consistent with a polylevel coded waveform having an uppermost level, and in that event, providing a signal, and for auditing the contents of said remembering means to ascertain if said remembering means contains the binary ones consistent with a polylevel coded waveform having a lowermost level, and in that event, providing a different signal, said auditing means including an inverting means for inverting certain selected ones of the output pulses from said remembering means, and a separating means for separating the output pulses from said remembering means, including those inverted in said inverting means, into one set of pulses consistent with a polylevel coded waveform having an uppermost level, and another set of pulses consistent with a polylevel coded waveform having a lowermost level, said inverting means including a plurality of inverters connected to the output of said remembering means, said separating means including a pair of OR-gates;

(d) a detecting means including a pair of slicers for detecting the presence of the uppermost and lowermost levels of said polylevel coded waveform, said detecting means providing one output pulse in the event of detection of the uppermost level, and a different output pulse in the event of detection of the lowermost level;

(e) a pair of AND-gates, the first of which provides an output signal in the event a signal from said auditing means consistent with an uppermost level fails to coincide with an output pulse from said detecting means indicating the presence of the uppermost level in said polylevel coded waveform, and the second of which provides an output signal in the event a signal from said auditing means consistent with a lowermost level fails to coincide with an output pulse from said detecting means indicating the presence of the lowermost level in said polylevel coded waveform;

(f) an OR-gate connected to the outputs of said pair of AND-gates to indicate an error in the event of an output signal from either of said AND-gates; and (g) a means connected between the outputs of said pair of AND-gates and said remembering means for setting the contents of said remembering means to the binary ones consistent with the detected level of the polylevel coded waveform in the event of the detection of an error.

References Cited

UNITED STATES PATENTS 3,061,814 10/1962 Crater ............ 340—146.1

MALCOLM A. MORRISON, *Primary Examiner.*

K. MILDE, *Assistant Examiner.*